Figures 1, 2, 3:
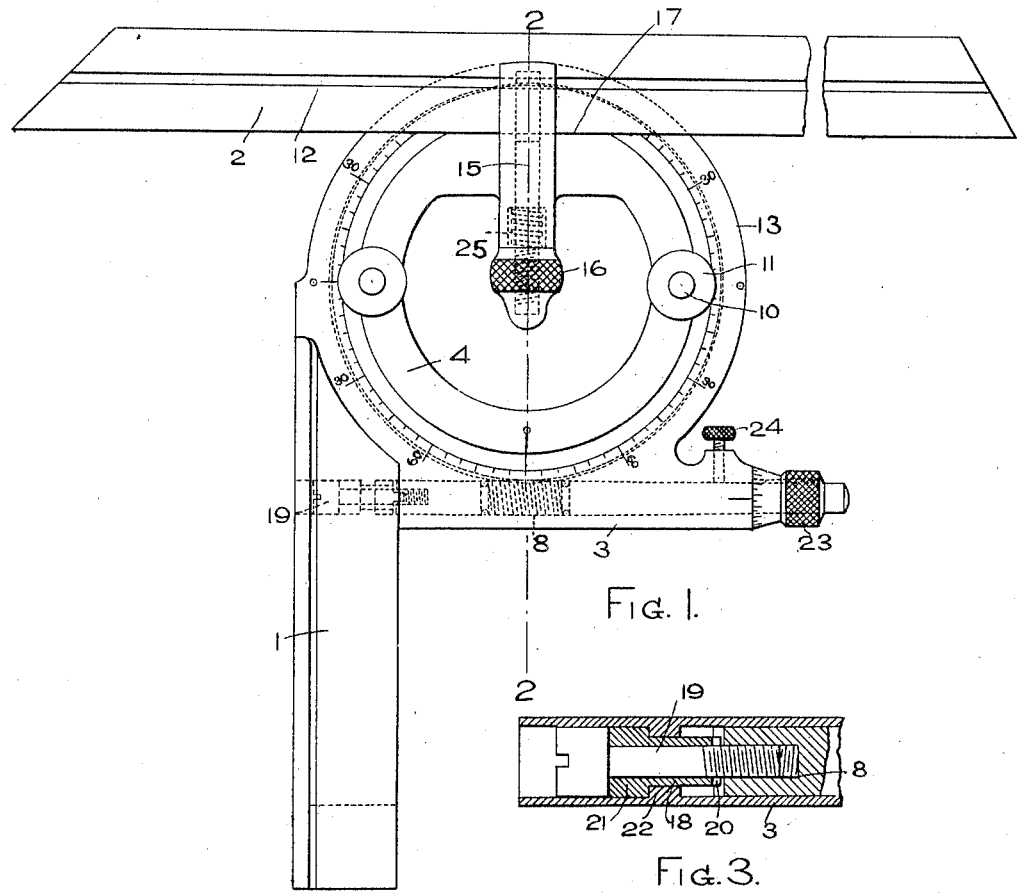

No. 759,239. PATENTED MAY 10, 1904.
C. CLARK.
INSTRUMENT FOR MEASURING ANGLES.
APPLICATION FILED JUNE 12, 1903.
NO MODEL.

WITNESSES
Edwin F. Samuels.
Farnum F. Dorsey

INVENTOR
Charles Clark
by his Attorneys
Phillips Van Everen Dick

No. 759,239. Patented May 10, 1904.

UNITED STATES PATENT OFFICE.

CHARLES CLARK, OF BEVERLY, MASSACHUSETTS.

INSTRUMENT FOR MEASURING ANGLES.

SPECIFICATION forming part of Letters Patent No. 759,239, dated May 10, 1904.

Application filed June 12, 1903. Serial No. 161,126. (No model.)

*To all whom it may concern:*

Be it known that I, CHARLES CLARK, a subject of the King of the United Kingdom of Great Britain and Ireland, residing at Beverly, in the county of Essex and State of Massachusetts, have invented certain new and useful Improvements in Instruments for Measuring Angles; and I do hereby declare the following to be a full, clear, and exact description of the invention, such as will enable others skilled in the art to which it appertains to make and use the same.

The present invention relates to improvements in instruments for measuring angles, and more particularly to protractors and bevel gages or squares.

It consists in the devices and combinations of devices hereinafter shown and described, and more particularly defined in the claims.

In the drawings, Figure 1 is a plan view of an improved protractor and bevel-gage embodying the present invention. Fig. 2 is a vertical section on line 2 2 in Fig. 1, and Fig. 3 is a vertical section, on an enlarged scale, of the means for adjusting the worm to take up wear.

In tools comprising concentrically-arranged plates or rings, one of which is graduated, carrying blades or a stock and a blade between which angles may be measured the accuracy with which the blade is set usually depends solely on the eye, and therefore an error of many minutes may occur in the angle. The present invention contemplates, therefore, the provision of means, such as a worm and worm-wheel, for effecting minute adjustments of the movable member, graduations being applied to the worm or equivalent device by which, owing to the relatively great movement of the same, much smaller adjustments may be indicated to the eye than can be observed upon the scale engraved upon one of the blade-carrying members. Since, however, it would consume considerable time to turn the blade through great angles by the means described, provision is made whereby the blade-carrying member may be disconnected at will from the micrometric adjusting means, so that the blade may be quickly set to approximately the correct angle by eye or by comparison with standards or templets, and then the special adjusting device may be used for final accurate adjustment. Other connections will suggest themselves to those skilled in the art in which the provision for throwing the micrometric adjustment into or out of connection will be of value.

Other valuable features of the invention will be noted in connection with the particular description of the illustrated embodiment thereof.

The illustrated embodiment of the invention is a tool for use by machinists or draftsmen as either a protractor or a bevel-gage, and it is constructed as follows: The members between which angles are to be indicated are a stock 1 and a blade 2. The stock is integral with a head 3, and the blade is carried by a ring 4, rotatably mounted on and concentric with a ring-formed part of the head. The stock 1 is bifurcated at 5 throughout the greater part of its length to permit the passage of the blade therethrough, the parts of the stock being connected by a blade or tenon 6, secured in a suitable mortise in the lower part of the stock. The lower surface of the ring 4 rests on an annular worm-wheel 7, mounted in the head concentrically with the ring. A worm 8, journaled in the head, engages the worm-wheel and serves both to rotate and to fix the same. A T-slot 9 in the worm-wheel is engaged by T-headed screws 10, which pass loosely through the ring 4 and are provided with thumb-nuts 11. When these thumb-nuts are tightened, the ring 4 and the worm-wheel are drawn tightly together and the ring partakes of the movement or the fixity of the worm-wheel; but when the nuts are loosened the ring may be turned independently of the worm-wheel, the screw-heads moving loosely in the T-slot. The blade is secured to the ring 4 in such a manner as to be adjustable longitudinally. A slot 12 in the blade is engaged by a tongue 13 on a clamping-rod 14, carried in a sleeve 15, integral with the ring 4. When the thumb-nut 16, mounted on the rod 14, is tightened, the inner edge of the blade is drawn tightly against a shoulder 17 on the ring 4. A spring 25 facilitates the operation of these parts. The blade is slightly thicker than the space between the sleeve 15 and the surface of the head when the ring 4 is clamped to the worm-wheel 7 by the thumb-nuts. This causes the blade to be clamped between the sleeve and the head and securely fastened thereby without the provision of special means for this purpose, the thumb-nuts 11 serving, therefore, to fix simultaneously both the ring and the blade. In order to take up wear between the threads of the worm and the worm-wheel, the worm is made slightly tapering at its threaded portion, and provision is made to adjust the worm longitudinally. A sleeve 18, concentric with a screw 19, engaging the end of the worm, has ears 20, engaging a slot in the end of the worm, and a shouldered head 21, engaging a shoulder 22 in the head 3. By turning the screw the worm may be drawn nearer to the shoulder 22, while the sleeve 18 prevents unintentional turning of the screw. The worm is turned by a knurled head 23, which is keyed loosely to the worm and may be removed when the tool is to be laid flat on a surface. The lower edge of the head 23 is graduated, being divided into sixty parts, and the pitch of the worm is such that one complete turn thereof causes the ring to turn through one degree. Therefore each graduation on the head 23 indicates one second. A set-screw 24 serves to fix the worm in adjusted position.

The above-described tool may be used in various ways. When great accuracy is desired, the blade and stock may be set exactly in line by means of a surface-plate. The nuts 11 may then be tightened, and the correct angle may be obtained by turning the worm. For ordinary purposes, however, it is sufficiently accurate to set the blade to the proper degree by eye, aided, preferably, by a magnifying-glass, the micrometric adjustment being disconnected, and then use the latter to measure minutes, since two graduations may be made by eye to coincide with great accuracy.

It is to be understood that the invention is not limited to the precise embodiment shown and described, but may be embodied in many other forms covered by the following claims.

Having thus described my invention, I claim as new and desire to secure by Letters Patent of the United States—

1. A tool for measuring angles, having, in combination, a blade, a stock, a rotatable member journaled in the stock, micrometric adjusting mechanism for continuously rotating the rotatable member, and means for operatively connecting the blade with, and disconnecting it from, the said member, substantially as described.

2. A tool for measuring angles, having, in combination, a stock, a blade, a worm-wheel, means for operatively connecting the worm-wheel with one of said members, a worm attached to the other of said members and engaging the worm-wheel, graduations for indicating the relative positions of the stock and blade, and graduations for indicating the angles through which the worm is rotated, substantially as described.

3. A tool for measuring angles, having, in combination, a head, a stock attached thereto, a rotatable member journaled in the head, a blade, means for securing the blade to said rotatable member, a worm-wheel journaled in the head concentrically with the rotatable member, a worm journaled in the head and meshing with the worm-wheel, and means for rotatively connecting the rotatable member and the worm-wheel, substantially as described.

4. A tool for measuring angles, having, in combination, a head, a rotatable member and a worm-wheel journaled therein, a blade, means for securing the blade to the rotatable member, and means for clamping together the rotatable member and the worm-wheel, the blade being engaged on opposite sides by the head and by a part of the rotatable member and being of sufficient thickness to be clamped therebetween when the rotatable member and the worm-wheel are clamped together by the last-mentioned means, substantially as described.

5. A tool for measuring angles, having, in combination, a blade, a stock, a worm-wheel, and a worm for adjusting the angle between said members, the worm being tapered, and means for adjusting the worm longitudinally to take up wear of the threads, substantially as described.

In testimony whereof I affix my signature in presence of two witnesses.

CHAS. CLARK.

Witnesses:
 HORACE VAN EVEREN,
 FRED O. FISH.